United States Patent
Abdelmonem et al.

(10) Patent No.: US 6,959,206 B2
(45) Date of Patent: Oct. 25, 2005

(54) DUAL-DUPLEXED, TOWER-TOP FRONT-END FOR A RADIO TRANSCEIVER SYSTEM

(75) Inventors: Amr Abdelmonem, Arlington Heights, IL (US); Stephen K. Remillard, Arlington Heights, IL (US); Scott C. Bundy, Broomfield, CO (US); Jonathan R. Scupin, Longmont, CO (US); Michael W. Cromar, Boulder, CO (US)

(73) Assignee: Isco International, Inc., Mt. Prospect, IL (US)

( * ) Notice: Subject to any disclaimer, the term of this patent is extended or adjusted under 35 U.S.C. 154(b) by 500 days.

(21) Appl. No.: 09/810,291

(22) Filed: Mar. 16, 2001

(65) Prior Publication Data

US 2002/0132591 A1 Sep. 19, 2002

(51) Int. Cl.[7] .............................. H04B 1/38; H04M 1/00
(52) U.S. Cl. ..................... 455/561; 455/63.1; 455/66.1; 455/68; 455/114.1; 455/306; 455/307; 62/51.1
(58) Field of Search .................................. 455/423, 424, 455/501–526, 63.1–63.7, 561, 562.1, 114.2–115.4, 296–307, 344, 560, 66.1, 67.11, 67.13; 62/51.1

(56) References Cited

U.S. PATENT DOCUMENTS

| | | | |
|---|---|---|---|
| 3,732,500 A | 5/1973 | Dishal et al. | |
| 3,744,467 A | 7/1973 | Wagner | |
| 3,781,705 A | 12/1973 | Dishal et al. | |
| 3,783,397 A | 1/1974 | Dishal et al. | |
| 3,911,366 A | 10/1975 | Baghdady | |
| 4,027,264 A | 5/1977 | Gutleber | |
| 4,328,591 A | 5/1982 | Baghdady | |
| 4,513,249 A | 4/1985 | Baghdady | |

(Continued)

FOREIGN PATENT DOCUMENTS

| | | |
|---|---|---|
| CA | 2260653 | 4/2001 |
| CA | 2288633 | 4/2004 |
| EP | 0704 986 A2 | 4/1996 |
| EP | 0812 069 A2 | 12/1997 |
| EP | 1 014 480 | 6/2000 |
| JP | 2000252853 | 9/2000 |
| WO | WO 99/06777 | 2/1999 |

OTHER PUBLICATIONS

H. Vincent Poor, et al., "Narrowband Interference Suppression in Spread Spectrum CDMA", IEEE Personal Communications Magazine, Third Quarter, 1994, pp. 14–27.

L. Milstein, "Interference Rejection Techniquest in Spread Spectrum Communications", Proceedings of the IEEE, vol. 76, No. 6, Jun. 1988.

International Search Report for International Application No. PCT/CA00/00100 dated Apr. 6, 2000.

Written Opinion for International Application No. PCT/CA00/00100 dated Mar. 2, 2001.

International Preliminary Examination Report for International Application No. PCT/CA00/00100 dated Apr. 27, 2001.

(Continued)

Primary Examiner—Charles Craver
(74) Attorney, Agent, or Firm—Marshall, Gerstein & Borun LLP

(57) ABSTRACT

A system handles both reception signals collected via an antenna and transmission signals generated by a communication station for transmission via the antenna. The system includes a cryostat, a receive path carrying the reception signals and disposed in the cryostat, and a transmit path carrying the transmission signals. The receive path and the transmit path are coupled between the system and the antenna and between the system and the communication station. Accordingly, the receive path is duplexed with the transmit path such that the front-end system has a first single input/output connection for coupling the front-end system to the antenna and a second single input/output connection for coupling the front-end system to the communication station.

16 Claims, 3 Drawing Sheets

U.S. PATENT DOCUMENTS

| | | | |
|---|---|---|---|
| 4,725,794 A | 2/1988 | Barczys | |
| 4,859,958 A | 8/1989 | Myers | |
| 4,992,747 A | 2/1991 | Myers | |
| 5,023,939 A | 6/1991 | Hori | |
| 5,038,115 A | 8/1991 | Myers et al. | |
| 5,168,508 A | 12/1992 | Iwasaki et al. | |
| 5,185,762 A | 2/1993 | Schilling | |
| 5,226,057 A | 7/1993 | Boren | |
| 5,244,869 A | 9/1993 | Billing | |
| 5,263,048 A | 11/1993 | Wade | |
| 5,267,234 A | 11/1993 | Harrison | |
| 5,307,517 A | 4/1994 | Rich | |
| 5,325,204 A | 6/1994 | Scarpa | |
| 5,343,496 A | 8/1994 | Honig et al. | |
| 5,541,959 A | 7/1996 | Myers | |
| 5,570,350 A | 10/1996 | Myer et al. | |
| 5,604,925 A | 2/1997 | O'Malley et al. | 455/254 |
| 5,640,385 A | 6/1997 | Long et al. | |
| 5,703,874 A | 12/1997 | Schilling | |
| 5,758,275 A | 5/1998 | Cox et al. | |
| 5,787,713 A | 8/1998 | Russo | |
| 5,789,347 A | 8/1998 | Button et al. | |
| 5,828,944 A | 10/1998 | Uppaluri et al. | 455/8 |
| 5,835,853 A | 11/1998 | Enoki et al. | |
| 5,941,080 A | 8/1999 | Richied et al. | |
| 5,974,101 A | 10/1999 | Nago | |
| 5,978,362 A | 11/1999 | Lee et al. | |
| 6,018,644 A | 1/2000 | Minarik | |
| 6,020,783 A | 2/2000 | Coppola | |
| 6,035,213 A | 3/2000 | Tokuda et al. | |
| 6,097,181 A | 8/2000 | Russo | |
| 6,104,934 A | 8/2000 | Patton et al. | |
| 6,205,340 B1 * | 3/2001 | Yandrofski et al. | 455/561 |
| 6,207,901 B1 | 3/2001 | Smith et al. | |
| 6,212,404 B1 * | 4/2001 | Hershtig | 455/561 |
| 6,243,370 B1 | 6/2001 | Schilling | |
| 6,367,266 B1 | 4/2002 | Kobayashi et al. | |
| 6,424,135 B1 | 7/2002 | Russo | |
| 6,480,706 B1 * | 11/2002 | Mimura et al. | 455/140 |
| 6,622,028 B1 * | 9/2003 | Abdelmonem et al. | 455/561 |
| 6,671,519 B2 | 12/2003 | Jeon et al. | |
| 2002/0151331 A1 * | 10/2002 | Abdelmonem et al. | 455/561 |
| 2002/0173341 A1 * | 11/2002 | Abdelmonem et al. | 455/561 |

OTHER PUBLICATIONS

Press Release: "Illinois Superconductor's SpectrumMaster Named Top Product of 1996" (Jan. 10, 1997).

Press Release: "Illinois Superconductor Corporation Announces Results of Initial PCS Product Testing—Company Also Receives Orders From New Customer" (Feb. 18, 1997).

Press Release: "Illinois Superconductor Corporation Unveils Advanced PCS Base Station Front End at CTIA's Wireless '97 in San Francisco" (Mar. 3, 1997).

Press Release: "Illinois Superconductor Corporation Demonstrates New Cellular Base Station Receiver Front End at CTIA's Wireless '97" (Mar. 4, 1997).

Press Release: "Illinois Superconductor Reports Results for 1996—Announces Completion of First RangeMaster.TM. Field Trials" Mar. 18, 1997).

Press Release: "Illinois Superconductor Introduces Two New Product Lines and Additions to Existing Product Lines" (Feb. 23, 1998).

Press Release: "Illinois Superconductor Completes Installation of 15 RangeMaster.COPYRGT. Systems for Southwestern Bell Mobile Systems" (Aug. 17, 1998).

Press Release: "Illinois Superconductor Corporation Announces New Customer—Ramcell Cellular Outfits 3 Cell Sites With RangeMaster.RTM. Equipment" (Aug. 26, 1998).

Press Release: "Illinois Superconductor Announces New Customer–Highland Cellular Outfits Six Cell Sites With RangeMaster.COPYRGT. Equipment" (Nov. 17, 1998).

Press Release: "Illinois Superconductor Announces New GSM Filter Line—Field Test Scheduled with Major OEM" (May 5, 1999).

Press Release: "Illinois Superconductor Announces Dramatic Results from CDMA Installation—Anticipate Increased Revenues to Result" (May 20, 1999).

Press Release: "Illinois Superconductor Announces 70% Capacity Improvement For CDMA Systems—Addresses Pressing Operator Needs as Cellular Demands Soar" (May 27, 1999).

Press Release: "Illinois Superconductor Announces Test Agreements with Third Generation Cellular OEMS—Positions Company as Premier 3G CDMA Filter Supplier" (Jun. 16, 1999).

Press Release: "Illinois Superconductor Announces Successful Results with TDMA Installations—Increased Cell Site Revenues Expected to Exceed Product Cost in Less than Three Months" (Aug. 19, 1999).

Press Release: "Illinois Superconductor Announces Test Agreement with Additional Third Generation System Supplier" (Aug. 24, 1999).

Rolfes, Marc, "Reducing the effect of RF Interference," Mobile Radio Technology, (Sep. 1995).

Abdelmonem, Amr, U.S. Appl. No. 09/130,274, "RF Receiver Having Cascaded Filters and an Intermediate Amplifier Stage."

Abdelmonem, Amr, U.S. Appl. No. 09/158,631, "Dual Operation Mode All Temperature Filter Using Superconducting Resonators."

Hong et al., "A High–Temperature Superconducting Duplexer for Cellular Base–Station Applications," *IEEE Transactions on Microwave Theory and Techniques*, vol. 48, No. 8, Aug. 2000.

Press Release, "Superconductor Tech Unveils Duplexer Pdt.," Dow Jones News Service via Dow Jones, Santa Barbara, California, Mar. 13, 2001.

International Search Report for International Application No. PCT/US01/27582 dated May 10, 2002.

* cited by examiner

DUAL-DUPLEXED, TOWER-TOP FRONT-END FOR A RADIO TRANSCEIVER SYSTEM

FIELD OF THE INVENTION

The present invention relates generally to radio frequency (RF) communication systems and, more particularly, duplexed configurations for radio communication stations, such as a base station for a mobile radio communication network.

BACKGROUND OF THE INVENTION

Radio frequency (RF) filters have been used with cellular base stations and other telecommunications equipment for some time. Such filters are conventionally used in a receiver front-end to filter out noise and other unwanted signals that would harm components of the receiver in the base station. For example, bandpass filters are conventionally used to filter out or block RF signals in all but one or more predefined bands. With the recent dramatic rise in wireless communications, such filtering should provide high degrees of both selectivity (the ability to distinguish between signals separated by small frequency differences) and sensitivity (the ability to receive weak signals) in an increasingly hostile frequency spectrum.

The relatively recent advancements in superconducting technology have given rise to a new type of RF filter, namely, the high-temperature superconducting (HTS) filter. HTS filters contain components that are superconductors at or above the liquid nitrogen temperature of 77K. Such filters provide greatly enhanced performance in terms of both sensitivity and selectivity as compared to a conventional filter. HTS components have been utilized in bandpass filters disposed in the receive path of a cellular base station.

Many front-end systems in the cellular and PCS (personal communication systems) industries utilize the same antenna for both reception and transmission. As a result, certain base stations have required a duplexed front-end. In the past, such duplexed configurations have included a stand-alone duplexer coupling the antenna to an RF filter in the receive path.

Base station installations have also required low losses as well as high selectivity. In some cases, an HTS bandpass filter has been incorporated into the receive path. When disposed in a duplexed configuration, however, losses were still undesirably introduced via the components in the duplexer. In addition, having both a stand-alone duplexer and an HTS filter added size as well as complexity to the system.

Generally speaking, duplexed receive configurations must address the significantly different power levels experienced by the receive in a simplex configuration. Utilization of an HTS bandpass filter has therefore complicated the configuration of the duplexed front-end, inasmuch as the use of such a filter in the transmit path would require significantly more cooling capacity. Prior duplexed front-ends have accordingly combined an HTS filter in the receive path with a conventional duplexer. However, the overall system suffered additional losses due to the additional connection between the HTS filter and the duplexer.

Typically, a duplexer constitutes a device or set of devices that utilizes the delay between the transmission of a pulse and the echo thereof to permit the connection of both a transmitter and a receiver (i.e., a transceiver) to a common antenna. Duplexers (or duplexed configurations) have been realized in a number of ways, including through combinations of components, such as 3-dB hybrids and bandpass filters, as well as, more generally, via the adjustment of the phase of the incoming and outgoing signals to prevent the undesired propagation of transmit signals in the receive path, and vice versa. For example, the phase of an incoming (i.e., received) signal may be adjusted such that it will not be propagated down the transmit path of the transceiver system by adjusting the length of the transmission line between the antenna and the components in the receive and transmit paths. One approach in adjusting the transmission line length is by installing additional cabling of a certain length between the antenna and an RF filter in the receive path.

However, adding such cabling undesirably adds to the losses encountered in the receive path. The noise figure for the receive path of the base station is, in large part, set by the losses introduced upstream of any amplification of the desired signal. As a result, any advantage gained through the use of low-loss components, such as an HTS bandpass filter and low-noise amplifier (or LNA), would be lost.

In prior base station installations, the receiver front-end has often been disposed on the tower supporting the antenna to minimize the length of such cabling, thereby minimizing any pre-LNA losses. Regardless of whether the front-end is disposed in a tower-top installation, it has generally been desirable to minimize cable lengths prior to the HTS filter and LNA in order to realize as much advantage from the HTS filter as possible.

SUMMARY OF THE INVENTION

In accordance with one aspect of the present invention, a system handles both reception signals collected via an antenna and transmission signals generated by a communication station for transmission via the antenna. The system includes a cryostat, a receive path carrying the reception signals and disposed in the cryostat, and a transmit path carrying the transmission signals. The receive path and the transmit path are coupled between the system and the antenna and between the system and the communication station.

The system preferably includes a coupler that couples the receive path and the transmit path between the antenna and the system. The coupler may include a phase-adjusting portion disposed in the cryostat, and the receive path may include a receive filter disposed in the cryostat. In one embodiment, the phase-adjusting portion includes a cable that couples the receive filter to the antenna, and the coupler may include a further phase-adjusting portion disposed outside of the cryostat. Alternatively, phase-adjustment via the coupler is provided solely by the phase-adjusting portion disposed in the cryostat. The system preferably also includes a coupler that couples the receive path and the transmit path between the system and the communication station. Alternatively, the system includes a duplexer that couples the receive path and the transmit path between the system and the communication station.

In a preferred embodiment, the receive filter includes a mechanism for protecting the receive filter from a transmission signal carried by the transmit path. To this end, the receive filter may include a first stage modified to protect the receive filter from the transmission signal.

In accordance with another aspect of the present invention, a front-end system handles both reception signals collected via an antenna and transmission signals generated by a communication station for transmission via the antenna.

The front-end system includes a cryostat, a receive path carrying the reception signals and disposed in the cryostat, and a transmit path carrying the transmission signals. The front-end system further includes a first cable coupled to both the receive path and the transmit path that carries both the transmission signals and the reception signals to and from the antenna, respectively, and a second cable coupled to both the receive path and the transmit path that carries both the reception signals and the transmission signals to and from the communication station, respectively.

In accordance with yet another aspect of the present invention, a front-end system handles both reception signals collected via an antenna and transmission signals generated by a communication station for transmission via the antenna. The front-end system includes a cryostat, a receive path carrying the reception signals and disposed in the cryostat, and a transmit path carrying the transmission signals. The receive path is duplexed with the transmit path such that the front-end system has a first single input/output connection for coupling the front-end system to the antenna and a second single input/output connection for coupling the front-end system to the communication station.

Other features and advantages are inherent in the apparatus claimed and disclosed or will become apparent to those skilled in the art from the following detailed description in conjunction with the accompanying drawings.

DETAILED DESCRIPTION OF PREFERRED EMBODIMENTS

The present invention is generally directed to RF communication systems that provide both reception and transmission functionality in a duplexed antenna configuration with minimum losses in at least the receive path. The present invention may, but need not, be incorporated into a wireless communication station, such as a base station for a cellular, PCS (personal communication systems), or other wireless system. While particularly useful in a base station context, the present invention may be applied in a variety of communication systems to realize low-loss reception in a duplexed configuration. In accordance with one aspect of the present invention, low-loss technologies, such as filtering in a cryogenic environment with conventional and/or HTS components, are utilized to provide a duplexed configuration with minimum loss in the receive path and high-power capabilities in the transmit path. More particularly, the duplexed configuration includes phase-adjusting components that adjust the phase of transmission signals and thereby provide duplexing functionality. Such phase-adjusting components may be fully or partially disposed in the cryogenic environment to maintain minimum losses in the receive path while prohibiting any undesirable propagation of transmission signals.

The following description will set forth the invention in a single-sector context for purposes of clarity only. As will be readily apparent to those skilled in the art, the invention may be easily applied in a system having one or more additional antennas for coverage of a multiple-sector cell. In such cases, the duplexed configuration of the present invention may incorporate the teachings of U.S. Pat. No. 5,828,944, entitled "Diversity Reception Signal Processing System," the disclosure of which is hereby incorporated by reference.

Figure 1:
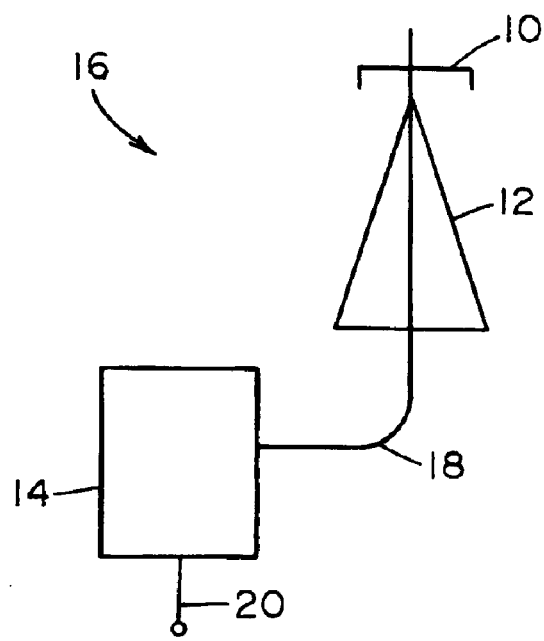
FIG. 1 is a block diagram of a portion of a base station having a front-end subsystem near an antenna tower.

With reference to FIG. 1, an antenna 10 is disposed upon and supported by an antenna tower 12, the particular structures of which are not pertinent to the practice of the present invention. The RF signals collected and/or transmitted by the antenna 10 are processed by a front-end subsystem 14 of a base station indicated generally at 16. As is well known to those skilled in the art, the base station 16 includes many additional components and portions not shown in the figures. The front-end subsystem (hereinafter "front-end") 14 is coupled to and in communication with the antenna 10 via a cable or cabling 18 that establishes a transmission line suitable for RF signals in the frequency bands of interest. The material and structure of the cable 18 is selected in the interest of minimizing losses through matching impedances and minimizing the length of the cable, as well as in accordance with other considerations known to those skilled in the art.

As will be described in further detail hereinbelow, the front-end 14 includes high-performance components that operate in a cooled environment maintained by a cooling system (not shown).

The front-end 14 may be disposed in a location within an interior portion (not shown) of the base station where, for example, additional signal processing is accomplished or, alternatively, at or near the antenna tower 12. In either case, it is preferable to minimize the length of the losses associated with the cable 18 by disposing the front-end 14 as close as possible to the antenna 10. Moreover, base station installations in the United States often involve rather tall antenna towers such that the low-loss, high-performance cabling, which is quite expensive and required for each sector, may significantly add to the costs associated with operation of the wireless system.

In general, the front-end 14 includes duplexing functionality that results in a single input/output port for the cable 18 leading to the antenna 10. To this end, the duplexing functionality allows a receive path leading from the antenna 10 to be connected to a transmit path leading to the antenna 10. The front-end 14 may include further duplexing functionality that provides for a single input/output port or connection for a cable or cabling 20 leading from the antenna 10 to the remainder of the wireless system or base station 16. In that case, the front-end 14 provides dual-duplexing functionality in the sense that both input/output ports of the front-end 14 are duplexed (i.e, the receive and transmit paths are connected at both ends of the front-end 14). In the event that the front-end has only the former, single-duplexing functionality, an additional cable or cabling (not shown) that establishes a second path from the front-end 14 would carry signals as well. In such a single-duplex configuration (or simply "duplex configuration"), one cable would carry the reception signals received by the antenna 10, while the other cable would carry the transmission signals provided to the antenna 10 for transmission to one or more mobile communication devices (not shown) in the wireless system.

As will be described in further detail hereinbelow, the front-end 14 preferably includes cryogenic components in the receive path to maintain minimal losses. In accordance with one embodiment of the present invention, such cryogenic components include an HTS bandpass filter or filter system. In accordance with another embodiment of the present invention, the duplexing functionality either for the cable 18 and/or the cable 20 is realized via a phase adjustment that removes the need to have a stand-alone duplexer couple the other components of the front-end 14 to the remainder of the base station 16. More particularly, coupling components disposed between the input/output ports and the other components of the front-end 14 will include phase-adjusting that restricts the propagation of transmission signals down the receive path. To this end, the coupling components are configured such that destructive interference forms for the undesired frequencies (e.g., the frequency of the transmission signals). Such coupling components are then disposed in a cryogenic environment to minimize any losses associated therewith.

Figure 2:
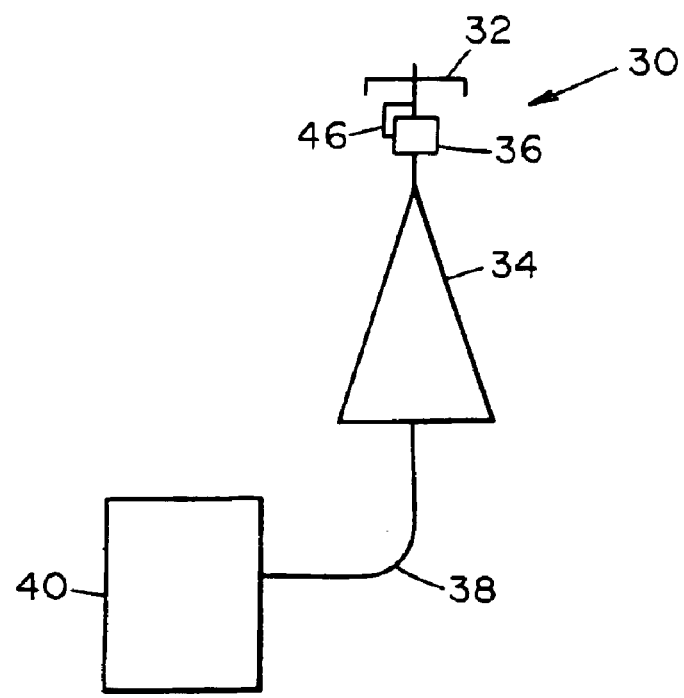
FIG. 2 is a block diagram of a portion of a base station having a tower-mounted front-end subsystem and another portion near an antenna tower.

With reference now to FIG. 2, an alternative base station indicated generally at 30 includes an antenna 32 and antenna tower 34 in much the same fashion as the base station 16 of FIG. 1. The antenna tower 34, however, also supports an additional portion of the base station, namely a tower-mounted front-end subsystem 36 (hereinafter "tower-mount front-end"). The tower-mount front-end 36 includes the same receive and transmit paths of the front-end 14 of FIG. 1, albeit disposed much more closely to the antenna 32. In this manner, the components coupling the antenna 32 to the tower-mount front-end 36 do not extend the length of the antenna tower 34, such that losses associated therewith may be decreased. The receive and transmit paths are preferably dual-duplexed in the sense that a single input/output port or connection couples the tower-mount front-end 36 to the remainder of the base station 30. To this end, a cable or cabling 38 leads from the antenna tower 34 to a portion 40 of the base station 30 responsible for further transceiver processing of the reception and transmission signals prior and subsequent to handling by the front-end 36, respectively. As a result of the dual-duplexed configuration, only the single cable 38 need extend from the tower-mount front-end 36 to the other portion 40 of the base station 30. In the event that installation of an additional cable (not shown) is not problematic, the tower-mount front-end need not provide dual-duplexing functionality. Nevertheless, it may be inconvenient and/or expensive in certain situations to install an additional cable the entire length of the antenna tower 34.

The manner in which the antenna 32 and the tower-mount front-end 36 are coupled depends to a large extent on the mounting mechanism (not shown) or methodology. Because the manner in which the front-end 36 is mounted is not pertinent to the practice of the present invention, a single cable 46 schematically represents the cable or cabling that accomplishes the coupling. In any event, the duplexing functionality provided via the tower-mount front-end 36 establishes that the coupling be realized in a single cable or cabling, as schematically shown in FIG. 2.

Other details regarding the base station 16 or the base station 30 may be found in U.S. Pat. No. 6,104,934, entitled "Cryoelectronic Receiver Front End," the disclosure of which is hereby incorporated by reference. For instance, the base stations 16 and 30 may include components and/or structure designed to ensure a stable operating environment. The aforementioned U.S. patent also discloses one manner in which the front-end 36 may be mounted upon and supported by the antenna tower 34.

FIGS. 3–6 show alternative configurations of the front-ends 14 and 36 of FIGS. 1 and 2, respectively. Elements common to one or more figures are identified with like reference numerals.

Figure 3:
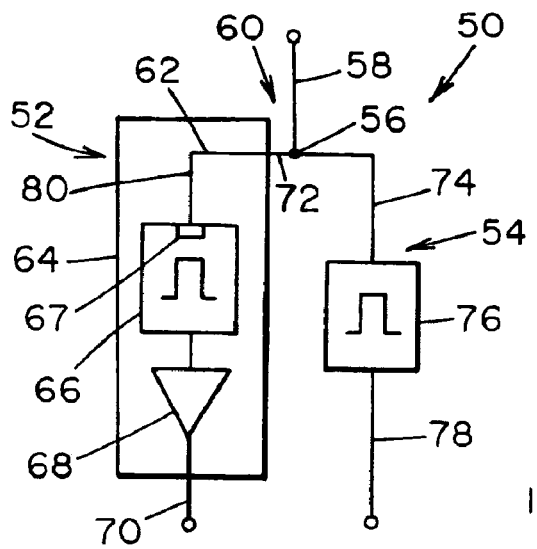
FIG. 3 is a schematic of a single-duplex front-end for incorporation in the base stations of FIG. 1 and FIG. 2.

With reference now to FIG. 3, a front-end system indicated generally at 50 includes a receive path 52 and a transmit path 54 for carrying reception and transmission signals, respectively. The receive and transmit paths 52 and 54 are coupled together at a node 56 such that a single cable 58 carries both the reception and transmission signals to the antenna (see FIGS. 1 and 2). The coupling establishes a duplexed configuration and is provided via a coupler indicated generally at 60. The coupler 60 includes a phase-adjusting portion 62 disposed in a cryostat 64 that houses components of the front-end system 50 that are operated in a cryogenic environment. The cryostat 64 may, for example, be constructed in accordance with the teachings of commonly assigned U.S. patent application Ser. No. 08/831,175, the disclosure of which is hereby incorporated by reference.

A bandpass receive filter 66 is also disposed in the cryostat 64 such that any losses introduced by the receive filter 66 are minimal or low. The receive filter may, but need not, include a high-temperature superconducting (HTS) material in the interest of maintaining extremely low losses despite high amounts of rejection. In general, such HTS bandpass filters are available from, for example, Illinois Superconductor Corporation (Mt. Prospect, Ill.). More particularly, the receive filter 66 may constitute an all-temperature, dual-mode filter constructed in accordance with the teachings of commonly assigned U.S. patent application Ser. No. 09/158,631, the disclosure of which is hereby incorporated by reference. While incorporating HTS technology to minimize low losses, the dual-mode filter remains operational at an acceptable filtering level despite a failure in the cooling system. Alternatively, the receive filter 66 includes bypass technology as set forth in the aforementioned U.S. Pat. No. 6,104,934 or in commonly assigned U.S. patent application Ser. No. 09/552,295, the disclosures of which is hereby incorporated by reference. It should be noted, however, that any necessary phase-adjustment for blocking transmit signals may need to be addressed in a bypass path as well.

The receive filter 66 may alternatively constitute a filter system having two or more cascaded filters in accordance with the teachings of commonly assigned U.S. patent application Ser. No. 09/130,274, the disclosure of which is hereby incorporated by reference. Such cascaded filter arrangements may provide extremely high levels of rejection without the difficulties associated with tuning a single highly selective filter. In such an embodiment, not all of the filters in the filter system need be disposed within the cryostat 64.

The receive filter 66 may utilize either thick or thin film technology or a hybrid of both. In the event that HTS materials are utilized, a thick film resonant structure may be constructed in accordance with the teachings of U.S. Pat. No. 5,789,347, the disclosure of which is hereby incorporated by reference. Furthermore, such HTS filters may need to be further protected from the transmission signals, that is, beyond the protection provided by the phase-adjusting portion 62 of the coupler 60. To this end, the receive filter 66 may be modified so as to function acceptably well even if a small fraction of the power transmitted by the transmission signal is experienced by the receive filter 66. For example, a small fraction of the transmission signal may impact the receive filter 66 even if the phase-adjusting portion 62 of the coupler 60 properly establishes destructive interference for signals at the transmission signal frequency. Accordingly, some portion or all of the receive filter 66 may be modified to be capable of handling the dissipation of energy associated with the small fraction of the transmission signal. For instance, the receive filter 66 may include a first stage 67 that has been modified to include only conventional materials (e.g., copper, silver, or gold) or to include higher proportions of such conventional materials (see, for example, the above-referenced patent application regarding a dual-mode filter).

Also disposed in the cryostat 64 is a low-noise amplifier (LNA) 68 that sets the noise figure for the receive path 52 of the front-end system 50. Examples of a suitable LNA are set forth in the above-referenced U.S. patents and patent applications. A cable 70 coupled to the output of the LNA 68 provides an output connection that carries the reception signals to the remainder of the base station.

The phase-adjusting portion 62 of the coupler 60 is preferably disposed in the cryostat 64, as shown, such that any losses associated therewith are minimized as a result of operation at cryogenic temperatures. In one embodiment utilizing additional cabling having an appropriate length for destructive interference, the losses associated with the added length are minimized.

The coupler 60 may include a further phase-adjusting portion 72 disposed outside of the cryostat 64 as well as a portion 74 that provides a connection to the transmit path 54. The transmit path 54 preferably includes a conventional (i.e., non-HTS) bandpass filter 76 that restricts the frequencies provided to the antenna (FIGS. 1 and 2) to the transmission frequency band, while at the same time protecting any circuitry in the transmit path from undesired signals. The transmit path 54 (and therefore the filter 76) is preferably disposed outside of the cryostat 64 in the interest of reducing the required cooling capacity of the cryostat 64 and the remainder of the cooling system. The transmit filter 76 may therefore process the transmission signals, which may be high-power signals, without concern for heat-generation.

In the embodiment of FIG. 3, only single-duplex functionality is provided, inasmuch as another cable or cabling 78 is included for carrying the transmission signals from the base station to the transmit path 54 of the front-end system 50.

The coupler 60 may also include a phase-adjusting portion for the transmit path 74 required for matching and decoupling the transmit path from the reception signal.

The phase-adjusting portion 62 of the coupler 60 may include a phase-shifting mechanism as is well-known to those skilled in the art. One approach of achieving the phase shift is by capacitively or inductively altering the coupling to the input of the receive filter. Alternatively, the phase-adjusting portion 62 of the coupler 60 constitutes a cable 80 having a length such that the length of the transmission line formed by the cable 80 results in the desired destructive interference.

Figure 4:
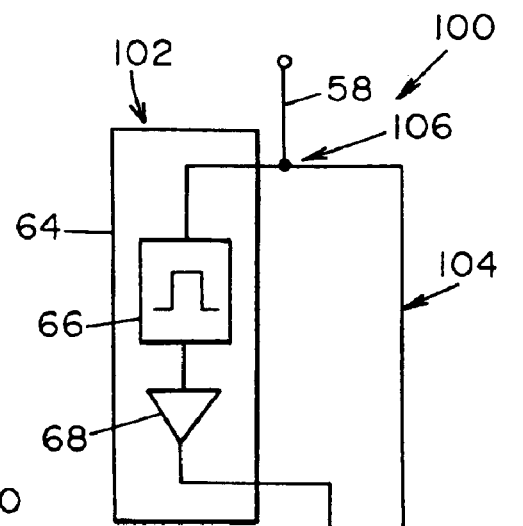
FIG. 4 is a schematic of a dual-duplex front-end for incorporation in the base stations of FIG. 1 and FIG. 2.

The front-end system 50 of FIG. 3 provides duplexed functionality for the connection between the antenna and the front-end of the base station. With reference now to FIG. 4, a dual-duplexed front-end system indicated generally at 100 is shown as having a receive path 102 and a transmit path 104 coupled together at two nodes, namely between the antenna and the front-end system 100 as well as between the front-end system 100 and the remainder of the base station. Such dual-duplexed functionality is provided via a coupler indicated generally at 106, which is similar to the coupler 60 of FIG. 3, and a stand-alone duplexer 108. Suitable duplexers for use in the front-end system 100 include one or more bandpass filters, and are available from Lorch Microwave (Salisbury, Md.).

The dual-duplexed configuration of FIG. 4 allows the front-end system 100 to be connected to the remainder of the base station via a cable or cabling 110. Accordingly, the cable 110 carries both the reception and transmission signals handled by the front-end system 100. In this manner, only a single cable runs the length of the antenna tower upon which the front-end system 100 may be disposed.

Figure 5:
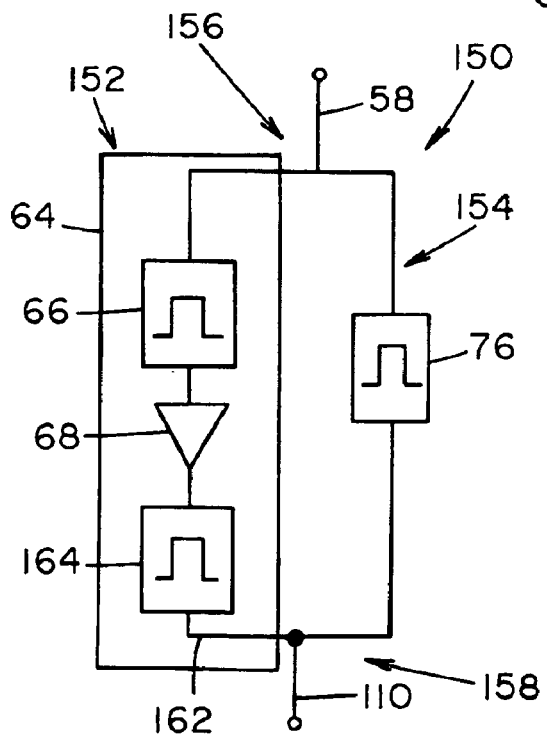
FIG. 5 is a schematic of another dual-duplex front-end for incorporation in the base stations of FIG. 1 and FIG. 2.

With reference now to FIG. 5, an alternative dual-duplexed front-end system 150 includes a customized dual-duplex configuration that does not rely upon a stand-alone, off-the-shelf duplexer. More particularly, the front-end system 150 includes a receive path 152 and a transmit path 154 that are coupled at both ends with a pair of couplers indicated generally at 156 and 158. The pair of couplers 156 and 158 may be similar to those described hereinabove and, for example, may utilize a cable of a certain length that establishes destructive interference in the receive path 152 for signals at the transmission signal frequency. To minimize losses associated with such cabling, all or a portion of such phase-adjustment may occur in the cryostat 64 such that, in general, phase-adjusting portions 160, 162 of the couplers 152, 158, respectively, are disposed in the cryostat 64.

The front-end system 150 also includes an additional bandpass filter 164 for the purpose of protecting the LNA from transmission signals. The filter 164 may, but need not, be disposed in the cryostat 64 as shown in FIG. 5. Similarly, the filter 164 may be an HTS filter as set forth hereinabove in connection with the receive filter 66.

Figure 6:
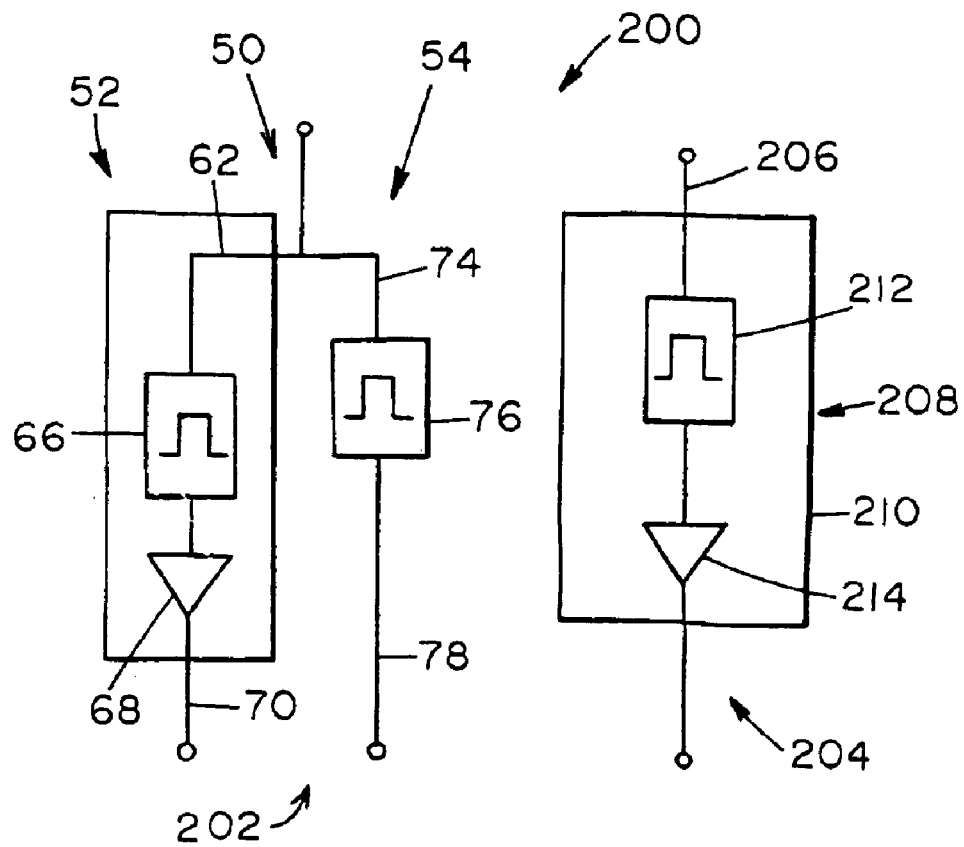
FIG. 6 is a schematic of a front-end with diversity reception for incorporation in the base stations of FIG. 1 and FIG. 2.

With reference now to FIG. 6, a diversity-receive front-end system indicated generally at 200 includes a main section 202 and a diversity-receive section 204. Generally speaking, the main section 202 may have a duplexed configuration in accordance with any of the aforementioned front-end systems of FIGS. 3–5, despite being shown as including the components of the front-end system 50 of FIG. 3.

The diversity-receive section 204 includes a cable or cabling 206 that couples a diversity front-end indicated generally at 208 to a diversity antenna (not shown). The diversity front-end 208 may include a separate cryostat 210 or utilize the same cryostat 64 utilized by the main section 202. A bandpass filter 212 and LNA 214 are disposed in the cryostat 210 for processing of the reception signals collected by the diversity antenna in the same manner as in the main section 202. As a result, the filter 212 and LNA 214 may include the same or similar components and materials as that described hereinabove in connection with the filter 66 and LNA 68.

In general, the manner in which the main and diversity sections are housed is not critical to the practice of certain aspects of the invention, but may result in certain efficiencies and advantages when combined in a common housing.

Figure 7:
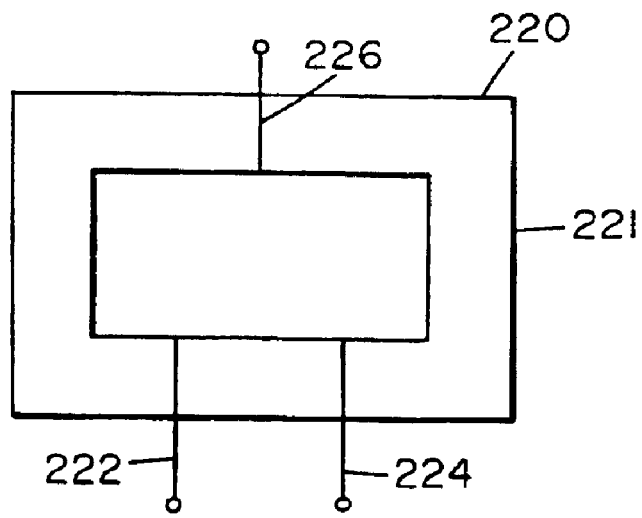
FIG. 7 is a schematic of an HTS duplexer in accordance with an alternative embodiment of the front-ends of FIGS. 3–6.

FIG. 7 shows an HTS duplexer 220 that could be used to replace the duplexer 108 of the embodiment of FIG. 4. Generally speaking, the HTS duplexer 220 is disposed in a cryostat 221 that may be the same or distinct from any other cryostat described hereinabove, and includes a pair of HTS bandpass filters (not shown) that permit reception signals on a first input/output line 222 to be duplexed with transmission signals on a second input/output line 224. Such bandpass filters may include bypass or dual-mode components as set forth hereinabove in connection with the filter 66. In any case, the duplexer 220 either inputs or outputs the duplexed signals on a line 226 in accordance with the knowledge of one skilled in the art.

As used herein, a "coupler" should not be understood to refer to the specific RF device commonly referred to as an "RF coupler", but rather more generally to refer a device capable of establishing a suitable transmission line for carrying signals in the desired frequency range between the points or devices being coupled.

Although certain instantiations of the teachings of the invention have been described herein, the scope of coverage of this patent is not limited thereto. On the contrary, this patent covers all instantiations of the teachings of the invention fairly falling within the scope of the appended claims either literally or under the doctrine of equivalents.

What is claimed is:

1. A front-end system for a communication station wherein the front-end system handles both reception signals collected via an antenna and transmission signals generated by the communication station for transmission via the antenna, comprising:

a cryostat;

a receive path carrying the reception signals and disposed in the cryostat;

a transmit path carrying the transmission signals;

a first coupler that couples the receive path and the transmit path to the antenna and includes a phase-adjusting portion such that the transmission signals are not carried by the receive path;

a cable for carrying the reception signals and the transmission signals to and from the communication station, respectively; and a second coupler that couples the receive path and the transmit path to the cable and includes a phase-adjusting portion such that the transmission signals are not carried by the receive path.

2. The front-end system of claim 1 further comprising a cryostat wherein the receive path comprises a bandpass filter disposed in the cryostat.

3. The front-end system of claim 2 wherein the phase-adjusting portion of the coupler is disposed in the cryostat.

4. The front-end system of claim 2 wherein the bandpass filter comprises means for protecting the bandpass filter from the transmission signals carried by the transmit path.

5. The front-end system of claim 2 wherein the bandpass filter comprises a first stage modified to protect the bandpass filter from the transmission signals carried by the transmit path.

6. The front-end system of claim 2 wherein the coupler comprises a further phase-adjusting portion disposed outside of the cryostat.

7. The front-end system of claim 2 wherein phase-adjustment via the coupler is provided solely by the phase-adjusting portion in the cryostat.

8. The front-end system of claim 1 wherein the antenna is disposed upon and supported by an antenna tower having a length such that the cable runs the length of the antenna tower to couple the front-end system to the communication station.

9. A front-end system for a communication station wherein the front-end system handles both reception signals collected via an antenna and transmission signals generated by the communication station for transmission via the antenna, comprising:

a cryostat;

a receive path carrying the reception signals and disposed in the cryostat;

a transmit path carrying the transmission signals;

a first cable coupled to both the receive path and the transmit path that carries both the transmission signals and the reception signals to and from the antenna, respectively;

a second cable coupled via a duplexer to both the receive path and the transmit path that carries both the reception signals and the transmission signals to and from the communication station, respectively, and a first coupler that couples the first cable to the receive path and includes a phase-adjusting portion such that the transmission signals are not carried by the receive path; and a second coupler that couples the second cable to the receive path and includes a phase-adjusting portion such that the transmission signals are not carried by the receive path.

10. The front-end system of claim 9 wherein the antenna is disposed upon and supported by an antenna tower having a length such that the second cable runs the length of the antenna tower to couple the receive path and the transmit path to the communication station.

11. The front-end system of claim 9 further comprising a coupler that couples the first cable to the receive path and includes a phase-adjusting portion such that the transmission signals are not carried by the receive path.

12. The front-end system of claim 9 wherein the receive path comprises a bandpass filter disposed in the cryostat.

13. The front-end system of claim 12 wherein the bandpass filter comprises means for protecting the bandpass filter from the transmission signals carried by the transmit path.

14. The front-end system of claim 12 wherein the bandpass filter comprises a first stage modified to protect the bandpass filter from the transmission signals carried by the transmit path.

15. The front-end system of claim 12 wherein the coupler comprises a further phase-adjusting portion disposed outside of the cryostat.

16. The front-end system of claim 12 wherein phase-adjustment via the coupler is provided solely by the phase-adjusting portion in the cryostat.

* * * * *